United States Patent
Cloutier (10) Patent No.: US 9,333,889 B1
(45) Date of Patent: May 10, 2016

(54) SEAT ASSEMBLY HAVING AN INFLATABLE BLADDER AND A METHOD OF ASSEMBLY

(71) Applicant: Lear Corporation, Southfield, MI (US)

(72) Inventor: Timothy Cloutier, Clawson, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/536,731

(22) Filed: Nov. 10, 2014

(51) Int. Cl.
*A47C 7/72* (2006.01)
*B60N 2/64* (2006.01)
*A47C 7/46* (2006.01)
*B60N 2/66* (2006.01)

(52) U.S. Cl.
CPC . *B60N 2/64* (2013.01); *A47C 7/467* (2013.01); *B60N 2/66* (2013.01)

(58) Field of Classification Search
CPC ...... B60N 2/56; B60N 2/5621; B60N 2/4415; B60N 2/02; B60N 2/66; B60N 2/64; A47C 7/467
USPC ........ 297/180.1, 284.6, 284.1, 463.4, 452.41, 297/463.2
See application file for complete search history.

(56) References Cited

U.S. PATENT DOCUMENTS

| | | | | |
|---|---|---|---|---|
| 3,974,827 A | * | 8/1976 | Bodeen | A47C 7/467 128/DIG. 20 |
| 4,108,492 A | * | 8/1978 | Kirby | A47C 7/021 297/284.3 |
| 4,589,695 A | * | 5/1986 | Isono | A47C 7/022 297/284.11 |
| 4,634,179 A | * | 1/1987 | Hashimoto | A47C 7/467 297/284.3 |
| 4,807,931 A | * | 2/1989 | Ishida | A47C 7/467 297/284.6 |
| 5,127,708 A | * | 7/1992 | Kishi | A61B 5/18 297/284.1 |
| 5,433,506 A | * | 7/1995 | Jensen | A47C 4/54 297/284.3 |
| 5,758,924 A | | 6/1998 | Vishey | |
| 5,826,937 A | | 10/1998 | Massara | |
| 5,868,466 A | | 2/1999 | Massara et al. | |
| 5,884,968 A | | 3/1999 | Massara | |
| 6,203,105 B1 | * | 3/2001 | Rhodes, Jr. | A47C 4/54 297/284.1 |
| 6,206,474 B1 | * | 3/2001 | Kruse | B60N 2/70 297/284.3 |
| 6,273,810 B1 | | 8/2001 | Rhodes, Jr. et al. | |
| 6,823,549 B1 | * | 11/2004 | Hampton | A61G 7/05776 297/284.6 |
| 7,727,171 B2 | * | 6/2010 | Ozaki | A61H 9/0078 297/284.3 |
| 8,608,243 B2 | * | 12/2013 | Maeda | B60N 2/66 297/217.3 |
| 8,827,371 B2 | | 9/2014 | Brncick et al. | |
| 2003/0230917 A1 | * | 12/2003 | Dorfler | B60N 2/66 297/284.1 |
| 2004/0189070 A1 | * | 9/2004 | Ladron De Guevara | A47C 4/54 297/284.6 |
| 2006/0284455 A1 | * | 12/2006 | Terech | B60N 2/5635 297/180.14 |
| 2009/0091168 A1 | * | 4/2009 | Kretschmer | A47C 7/42 297/284.1 |
| 2009/0108654 A1 | * | 4/2009 | Petzel | B60N 2/4415 297/284.1 |
| 2010/0244504 A1 | * | 9/2010 | Colja | A61H 9/0078 297/180.1 |
| 2010/0289302 A1 | * | 11/2010 | Cheng | B60N 2/002 297/180.12 |
| 2012/0032478 A1 | * | 2/2012 | Friderich | B60N 2/448 297/180.1 |
| 2013/0062920 A1 | * | 3/2013 | McDiarmid | A47C 4/54 297/284.6 |
| 2014/0265491 A1 | * | 9/2014 | Galbreath | B60N 2/643 297/284.1 |
| 2015/0165940 A1 | * | 6/2015 | Schnell | B60N 2/4415 297/284.3 |
| 2015/0217665 A1 | * | 8/2015 | Hickey | B60N 2/565 297/180.1 |

* cited by examiner

*Primary Examiner* — Jose V Chen
(74) *Attorney, Agent, or Firm* — Brooks Kushman P.C.

(57) ABSTRACT

A seat assembly having an inflatable bladder and a method of assembly. The seat assembly may have a seat cushion that may have a slit. The inflatable bladder may be inserted through a slit from a second surface of the seat cushion toward a first surface and may be received in the indentation.

20 Claims, 7 Drawing Sheets

SEAT ASSEMBLY HAVING AN INFLATABLE BLADDER AND A METHOD OF ASSEMBLY

TECHNICAL FIELD

This patent application relates to a seat assembly having an inflatable bladder and a method of assembly.

BACKGROUND

A vehicle seat lateral and lumbar support bladder assembly is disclosed in U.S. Pat. No. 5,758,924.

SUMMARY

In at least one embodiment, a seat assembly is provided. The seat assembly may include a seat cushion, an inflatable bladder, and a tube assembly. The seat cushion may have a first surface, a second surface, and a slit. The second surface may be disposed opposite the first surface. The slit may extend through the seat cushion to the second surface. The inflatable bladder may be disposed proximate the first surface. The tube assembly may be fluidly connected to the inflatable bladder. The tube assembly may be disposed proximate the second surface and may extend into the slit.

In at least one embodiment, a seat assembly is provided. The seat assembly may include a seat back that may have a seat cushion, a set of inflatable bladders, and a set of tube assemblies. The seat cushion may have a first surface, a second surface, a set of indentations, and a set of slits. The second surface may be disposed opposite the first surface. Members of the set of indentations may be spaced apart from each other and may extend from the first surface toward the second surface. Each member of the set of indentations may have a bottom surface that may be recessed from the first surface. Each member of the set of slits may be associated with a corresponding member of the set of indentations and may extend from the bottom surface to the second surface. Each member of the set of inflatable bladders may be received in a corresponding member of the set of indentations. The set of tube assemblies may be disposed proximate the second surface. Each member of the set of tube assemblies may be fluidly connected to at least two members of the set of inflatable bladders.

In at least one embodiment, a method of assembling a seat assembly may be provided. The method may include providing a seat cushion that may have a first surface, a second surface, an indentation, and a slit. The second surface may be disposed opposite the first surface. The indentation may have a bottom surface that may be recessed from the first surface. The slit may extend from the bottom surface to the second surface. An inflatable bladder that may be fluidly connected to a tube assembly may be inserted through the slit from the second surface to the bottom surface such that a portion of the tube assembly may be disposed proximate the slit.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
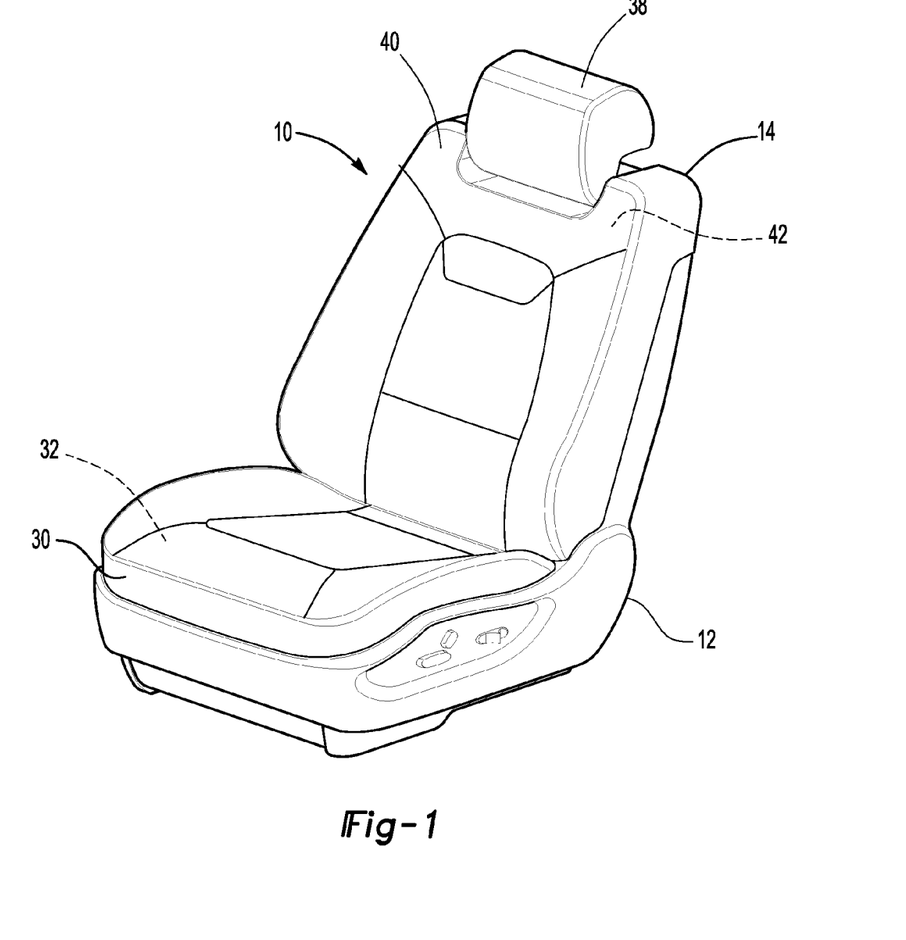
FIG. 1 is a perspective view of an exemplary seat assembly.

Referring to FIG. 1, an exemplary seat assembly 10 is shown. The seat assembly 10 may be configured for use in vehicular and/or non-vehicular applications. Vehicular applications may include land vehicles, such as cars or trucks, and non-land vehicles, such as aircraft or marine vessels. Non-vehicular applications may include home or office furniture, such as chairs or the like.

Figure 2:
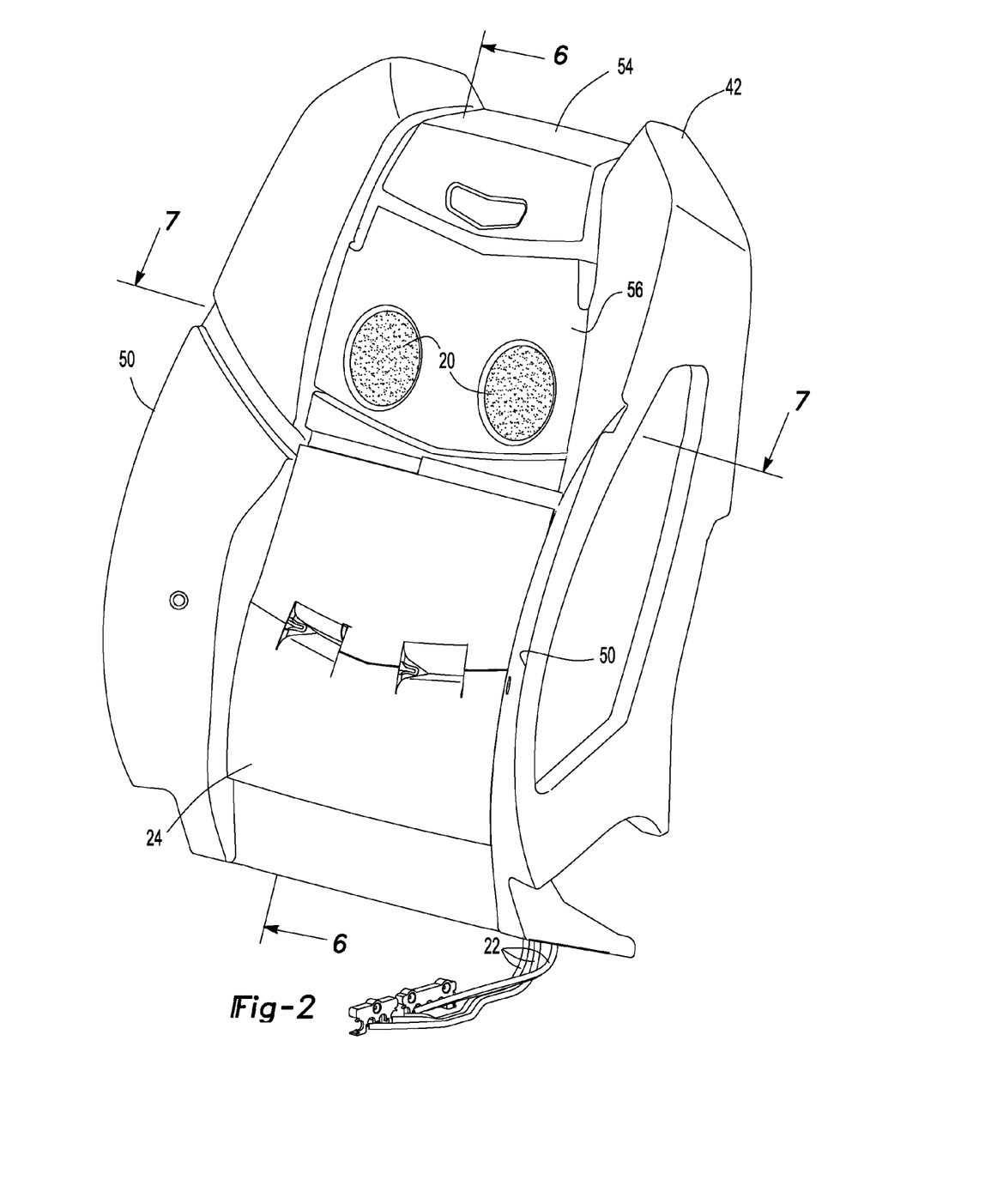
FIG. 2 is a front perspective view of a portion of a seat back of the seat assembly including a seat cushion, a ventilated seat pad, and a set of inflatable bladders.

The seat assembly 10 may include a seat bottom 12 and a seat back 14. As is best shown in FIG. 2, the seat assembly 10 may also include one or more inflatable bladders 20, one or more tube assemblies 22, and a ventilated seat pad 24.

Referring to FIG. 1, the seat bottom 12 may be configured to support a seat occupant. In a vehicular application, the seat bottom 12 may be mounted to a support surface, such as a vehicle floor. The seat bottom 12 may include a support structure, such as a seat frame, seat pan, and/or support wires that may support and facilitate mounting of components of the seat assembly 10. The seat bottom 12 may also include seat bottom trim cover 30 and a seat cushion 32.

The seat bottom trim cover 30 may be disposed over or upon the seat cushion 32 and may form or provide at least a portion of a visible exterior surface of the seat bottom 12. Moreover, a seat occupant may be disposed on the seat bottom trim cover 30 when in a seated position. The seat bottom trim cover 30 may include a plurality of trim panels that may be assembled in any suitable manner, such as by stitching. In addition, the seat bottom trim cover 30 may be made of any suitable material or materials, such as fabric, leather, vinyl, carpet, or combinations thereof.

The seat cushion 32, which may also be referred to as a seat bottom cushion, may be at least partially concealed by the seat bottom trim cover 30 and may be directly or indirectly supported by the support structure of the seat bottom 12. The seat cushion 32 may be made of any suitable material, such as foam.

The seat back 14 may be configured to support the back of a seat occupant. The seat back 14 may include a support structure, such as a seat frame, seat pan, and/or support wires that may support and facilitate mounting of components of the seat assembly 10. In at least one embodiment, the seat back 14 may be pivotally disposed on the seat bottom 12 and may include a headrest or head restraint assembly 38 that may be disposed proximate a top of the seat back 14. One or more support posts may couple the head restraint assembly 38 to the support structure of the seat back 14. The seat back 14 may also include a seat back trim cover 40 and a seat cushion 42.

The seat back trim cover 40 may be disposed over or upon the seat cushion 42 and may form or provide at least a portion of a visible exterior surface of the seat back 14. The seat back trim cover 40 may include a plurality of trim panels that may be assembled in any suitable manner, such as by stitching. In addition, the seat back trim cover 40 may be made of any suitable material or materials, such as fabric, leather, vinyl, carpet, or combinations thereof.

The seat cushion 42, which may also be referred to as a seat back cushion, may be at least partially concealed by the seat back trim cover 40 and may be directly or indirectly supported by the support structure of the seat back 14. The seat cushion 42 may be made of any suitable material, such as foam.

Referring to FIG. 2, an exemplary seat cushion 42 is shown in more detail. The seat cushion 42 is shown without the seat back trim cover 40 to move clearly show the seat cushion 42 and other components of the seat assembly 10. One or more inflatable bladders 20 and the ventilated seat pad 24 may be disposed on the seat cushion 42; however, it is contemplated that one or more inflatable bladders 20 and/or a ventilated seat pad 24 may be provided with the seat cushion 32 of the seat bottom 12. For brevity, the seat assembly 10 will be primarily described with reference to a seat cushion 42 that may be provided with the seat back 14 that may have inflatable bladders 20 and a ventilated seat pad 24.

Referring to FIGS. 2-5, the seat cushion 42 may include a pair of side bolsters 50, a center seating region 52, a top surface 54, a first surface 56, a second surface 58, one or more indentations 60, and one or more slits 62.

Figure 3:
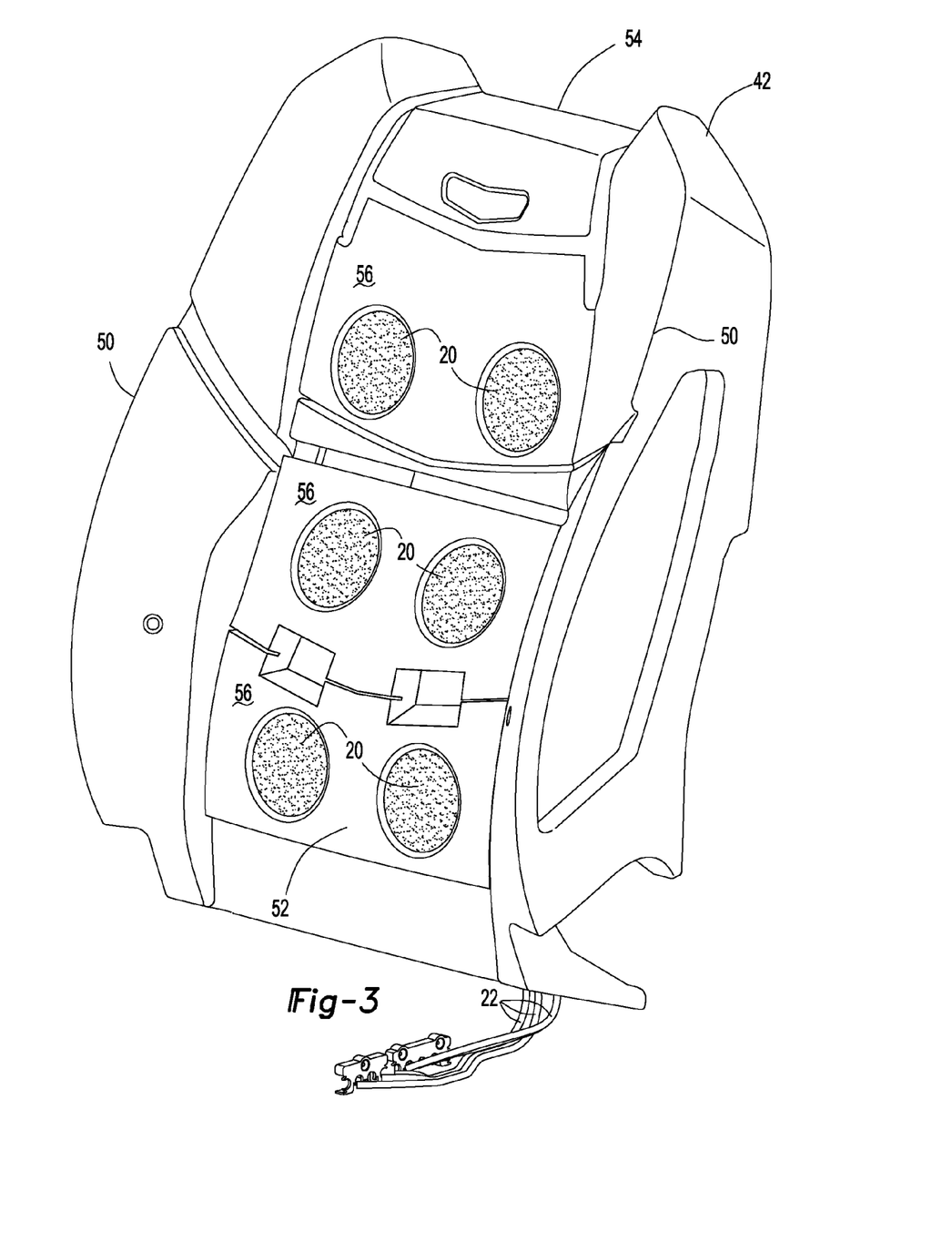
FIG. 3 is a front perspective view of the portion of the seat back shown in FIG. 2 without the ventilated seat pad.
Figure 5:
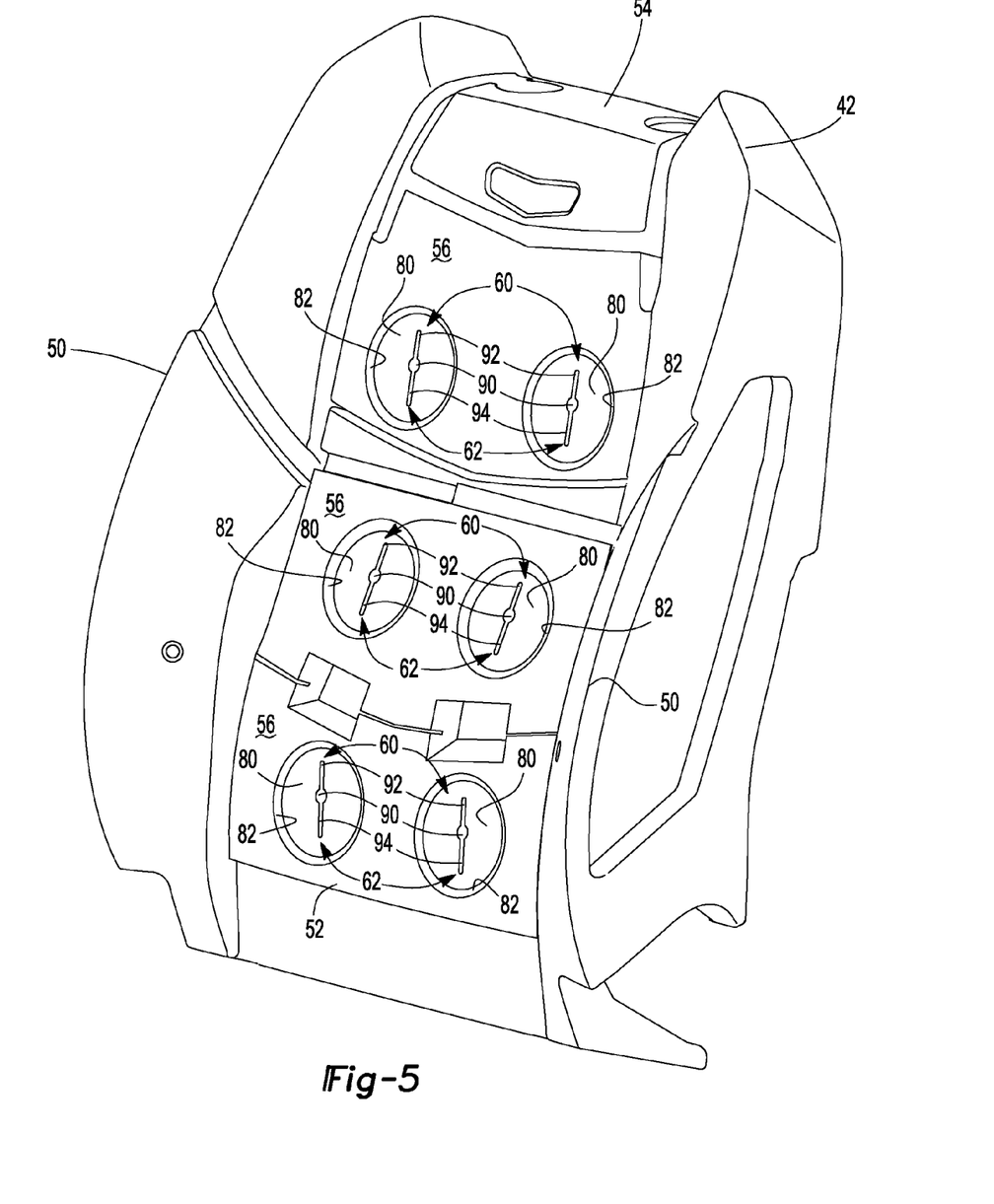
FIG. 5 is a front perspective view of the seat cushion.

Referring primarily to FIGS. 2, 3 and 5, the side bolsters 50 may generally extend along opposing lateral sides of the seat back 14 and may extend between the top and bottom of the seat cushion 42. As such, the side bolsters 50 may be disposed along opposite sides of the center seating region 52 and may extend outwardly or forwardly from the center seating region 52 toward a seat occupant.

The center seating region 52 may be configured to support the back of a seat occupant. The center seating region 52 may be disposed between the side bolsters 50 and may extend between the top and bottom of the seat cushion 42.

The top surface 54 may be disposed proximate the top of the seat back 14 and/or proximate the head restraint assembly 38. The top surface 54 may extend across the top of the seat back 14 from the first surface 56 to the second surface 58.

The first surface 56 may face toward the front of the seat assembly 10 and may face toward a seat occupant. The first surface 56 may be associated with at least the center seating region 52 of the seat cushion 42. In addition, the first surface 56 may be disposed proximate and may engage the seat back trim cover 40 and/or the ventilated seat pad 24.

Figure 4:
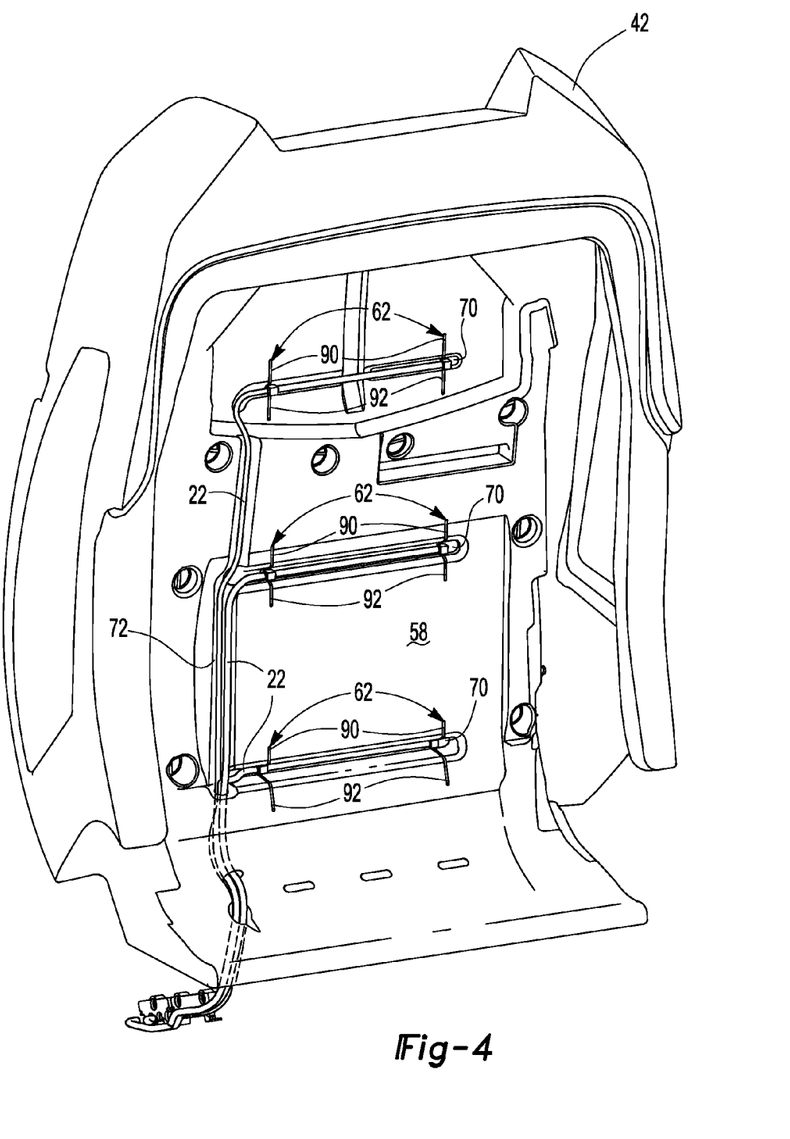
FIG. 4 is a rear perspective view of the portion of the seat back shown in FIG. 2.

Referring to FIG. 4, the second surface 58 may be disposed opposite the first surface 56. As such, the second surface 58 may face toward the back of the seat assembly 10 and may face away from a seat occupant. One or more grooves 70 may be provided with or may extend from the second surface 58.

The grooves 70 may be configured as elongated recesses that may extend from the second surface 58 toward the first surface 56. A plurality of grooves 70 may be referred to as a set of grooves 70. Each groove 70 may be configured to receive at least one tube assembly 22, or at least one member of the set of tube assemblies 22. In FIG. 4, three grooves 70 are shown that may extend laterally across the seat cushion 42 between the side bolsters 50, although it is contemplated that a greater or lesser number of grooves 70 may be provided. The grooves 70 in FIG. 4 each receive and help position a corresponding tube assembly 22. The grooves 70 may be substantially linear and/or may be disposed substantially parallel to each other in one or more embodiments. In addition, the grooves 70 may extend between two different slits 62, or between two members of a set of slits 62.

One or more grooves 70 may extend from a connecting groove 72. For example, the connecting groove 72 may be disposed proximate each groove 70 and may intersect an end of each groove 70. The connecting groove 72 may receive and help route the tube assemblies 22 to a corresponding groove 70. The connecting groove 72 may be configured as an elongated recess that may extend from the second surface 58 toward the first surface 56. In addition, connecting groove 72 may be substantially linear and may extend in a generally vertical direction along the seat cushion 42 in one or more embodiments.

Referring to FIG. 5, one or more indentations 60 may be provided with the seat cushion 42. Each indentation 60 may be configured to receive and help position an inflatable bladder 20 as will be discussed in more detail below. A plurality of indentations 60 may be referred to as a set of indentations 60. In FIG. 5, six indentations 60 are shown, although it is contemplated that a greater or lesser number of indentations 60 may be provided. The indentations 60 may be located on the center seating region 52 of the seat cushion 42. The indentations 60 may be generally arranged in rows and columns. For example, the indentations 60 in FIG. 5 are arranged in three rows and two columns such that two indentations 60 are provided in each row. The indentations 60 may be separated or completely spaced apart from each other and may be separated from channels in the seat cushion 42 that may help secure the seat bottom trim cover 30. Each indentation 60 may extend from the first surface 56 toward the second surface 58. As such, each indentation 60 may be recessed or offset from the first surface 56. Each indentation 60 may be at least partially defined by a bottom surface 80 and a perimeter surface 82.

The bottom surface 80 may be offset from or recessed from the first surface 56. For example, the bottom surface 80 may be recessed by about 4-8 mm from the first surface 56 in one or more embodiments. As such, the bottom surface 80 may be positioned closer to the second surface 58 than a portion of the first surface 56 that is disposed directly adjacent to the indentation 60, but may be disposed closer to the first surface 56 than the second surface 58. The bottom surface 80 may be generally planar in one or more embodiments and may be disposed substantially parallel to a portion of the first surface 56 that may extend around the indentation 60.

The perimeter surface 82 may extend from the first surface 56 to the bottom surface 80. As such, the perimeter surface 82 may extend toward the second surface 58 but may be spaced apart from the second surface 58. The perimeter surface 82 may extend around the inflatable bladder 20 and may help position and retain the inflatable bladder 20 in a corresponding indentation 60. As such, the inflatable bladder 20 may be retained in an indentation 60 without gluing or bonding the inflatable bladder 20 to the seat cushion 42. In FIG. 5, the perimeter surface 82 has a generally circular configuration. Such a configuration may help reduce stress concentration points on the perimeter surface 82 and may help inhibit tearing of the seat cushion 42.

The slit 62 may extend from each indentation 60 to the second surface 58. More specifically, each slit 62 may extend from the bottom surface 80 to the second surface 58. In addition, each slit 62 may be completely spaced apart from the perimeter surface 82, which may allow the bottom surface 80 to better support an inflatable bladder 20 and inhibit the inflatable bladder 20 from being pushed through the slit 62 toward the second surface 58. A plurality of slits 62 may be referred to as a set of slits 62. In one or more embodiments, a slit 62 may have a slit hole 90, a first slit branch 92, and a second slit branch 94.

The slit hole 90 may be disposed proximate a center of each indentation 60. The slit hole 90 may be configured as a through hole that may extend from the bottom surface 80 of the indentation 60 to a corresponding groove 70. In addition, the slit hole 90 may extend along a slit hole axis 96. The slit hole axis 96 may extend through the seat cushion 42 and may be disposed substantially perpendicular to the bottom surface 80 or a portion of the bottom surface 80 disposed adjacent to the slit hole 90. The perimeter surface 82 may be radially disposed with respect to the slit hole axis 96 in one or more embodiments. The slit hole 90 may receive and may engage a portion of the tube assembly 22 as will be discussed in more detail below.

The first slit branch 92 and the second slit branch 94 may extend from the slit hole 90. For example, the first slit branch 92 and the second slit branch 94 may be substantially coplanar with each other and the slit hole axis 96. Moreover, the first slit branch 92 and the second slit branch 94 may be narrower than the slit hole 90 such that portions of the seat cushion 42 disposed on opposite sides of the first slit branch 92 and the second slit branch 94 may engage each other, thereby providing additional support to a corresponding inflatable bladder 20. The first slit branch 92 and the second slit branch 94 may extend in opposite directions from the slit hole 90 to help facilitate installation of an inflatable bladder 20 without tearing the seat cushion 42. In one or more embodiments, the first slit branch 92 and the second slit branch 94 may have substantially equal lengths and may be completely spaced apart from the perimeter surface 82. The first slit branch 92 and the second slit branch 94 may extend in a substantially vertical direction along the seat cushion 42 as shown in FIG. 5. In addition, the first slit branch 92 and the second slit branch 94 may extend from the bottom surface 80 of the indentation 60 as is best shown in FIG. 5 to the second surface 58 and to a corresponding groove 70 as is best shown in FIG. 4.

Figure 6:
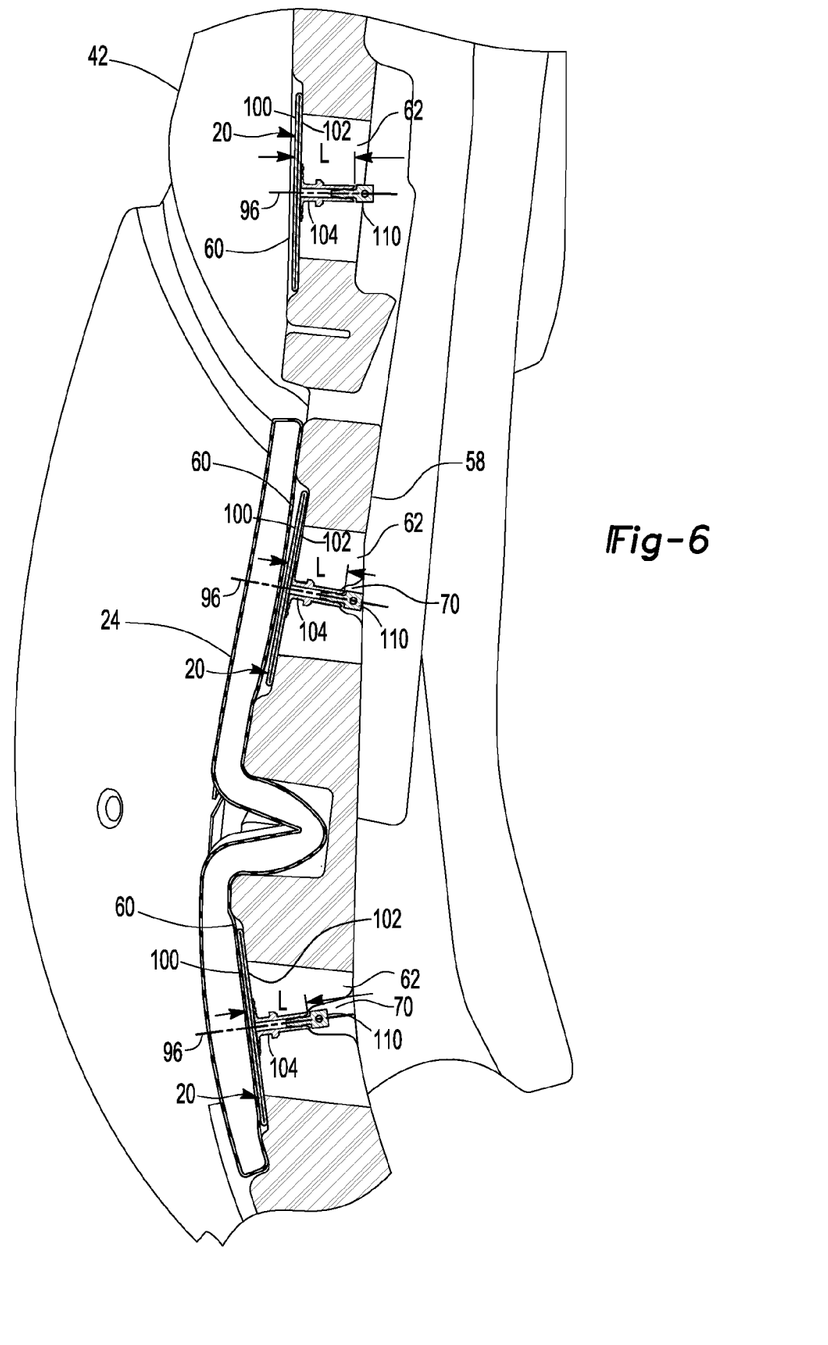
FIG. 6 is a section view of the portion of the seat back along section line 6-6 in FIG. 2.

Referring to FIG. 6, a section view of a portion of the seat back 14 is shown. The section view illustrates slit configurations in which the slits 62 are configured with substantially equal slit lengths while the thickness of the seat cushion 42 varies from the first surface 56 to the second surface 58. More specifically, each slit 62 or slit hole 90 may have a substantially equal slit length L that may be extend from the bottom surface 80 to a corresponding groove 70. The slit length L may be measured along the slit hole axis 96. A substantially equal slit length L may be provided by increasing the depth of a groove 70 in regions of the seat cushion 42 having an increased thickness from the first surface 56 to the second surface 58. For example, the seat cushion 42 in FIG. 6 is thicker at the bottom groove 70 than at the middle groove 70. As such, the bottom groove 70 has a greater depth than the middle groove 70 (e.g., the distance from the second surface 58 to the bottom of the bottom groove 70 is greater than a distance from the second surface 58 to the bottom of the middle groove 70). Similarly, the middle groove 70 may have a greater depth than the top groove 70 (e.g., the distance from the second surface 58 to the bottom of the middle groove 70 may be greater than a distance from the second surface 58 to the bottom of the top groove 70). Such a configuration may allow each slit hole 90 to be provided with a substantially constant slit length L, which in turn may allow standardized or common inflatable bladders 20 and tube assembly connections to be employed. Substantially equal slit lengths L may also be provided in each row of indentations 60 as is best shown in FIG. 7.

Figure 7:
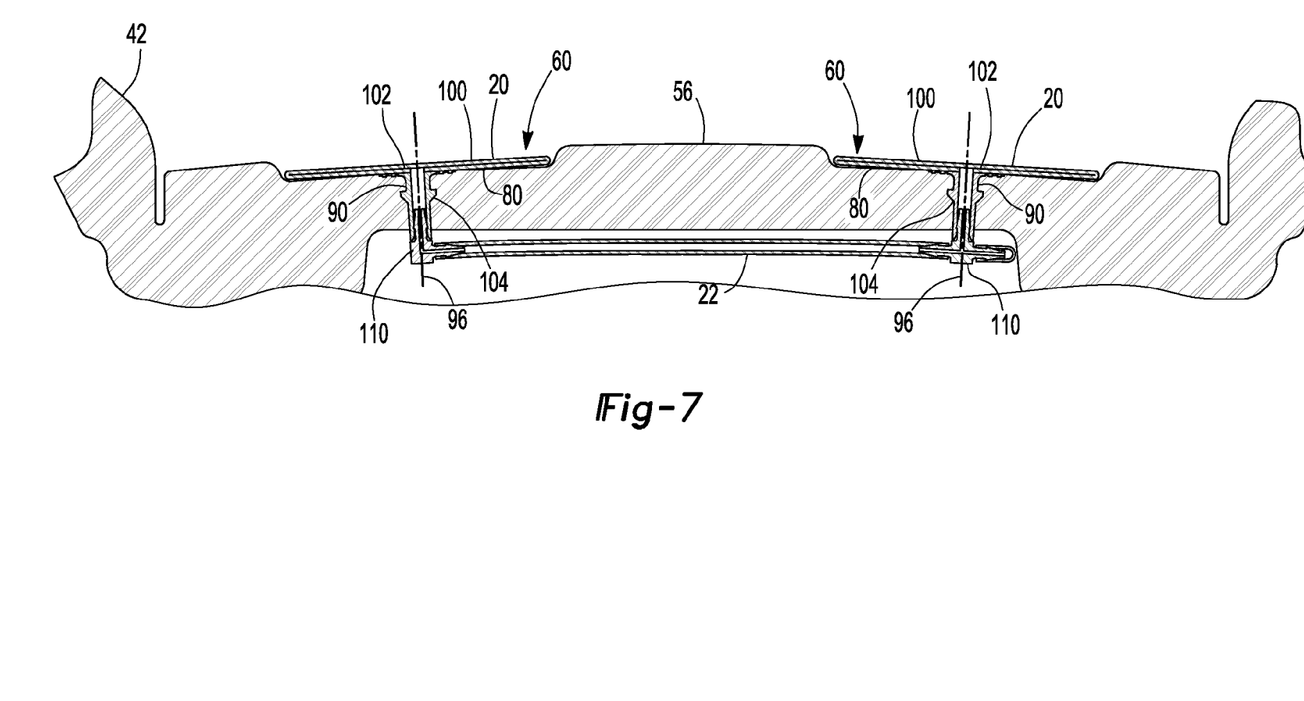
FIG. 7 is a section view of the portion of the seat back along section line 7-7 in FIG. 2.

Referring to FIGS. 2, 6, and 7, each inflatable bladder 20 may be received in a corresponding indentation 60. A plurality of inflatable bladders may be referred to as a set of inflatable bladders 20. In one or more embodiments, the inflatable bladder 20 may be configured as a massage bladder that may be inflated and deflated in a predetermined sequence to help massage the back of a seat occupant. For instance, each row of inflatable bladders 20 may be inflated and deflated in a predetermined sequence such each row of inflatable bladders 20 is inflated and deflated within a relatively short period of time, such as within around 10 seconds. As is best shown in FIG. 7, each inflatable bladder 20 may be substantially air impermeable and may have a first panel 100, a second panel 102, and a fitting 104.

The first panel 100 may face toward a trim cover, such as the seat back trim cover 40 or toward a seat occupant. Prior to inflation, the first panel 100 may be recessed and offset from the first surface 56 as is best shown in FIG. 7. It is also contemplated that the first panel 100 may be substantially aligned with the first surface 56 when substantially deflated in one or more embodiments. After inflation, the first panel 100 may move away from the bottom surface 80 and may extend outwardly from the first surface 56.

The second panel 102 may be disposed opposite the first panel 100. Accordingly, the second panel 102 may be disposed proximate or may engage the bottom surface 80 of the indentation 60. The second panel 102 may be attached to the first panel 100 proximate a perimeter of the inflatable bladder 20. As such, the first panel 100 and the second panel 102 may cooperate to define a chamber that may receive a pressurized gas, such as air, when the inflatable bladder 20 is inflated.

The fitting 104 may extend from the second panel 102 into the slit hole 90. The fitting 104 may facilitate coupling of the inflatable bladder 20 to a tube assembly 22. For example, the fitting 104 may engage the tube assembly 22 with an interference fit that may inhibit leakage of pressurized gas between the tube assembly 22 and the fitting 104. The fitting 104 may also include one or more barbs that may protrude or extend from an outer surface or outside circumference of the fitting 104. The barbs may engage and help couple the fitting 104 to the tube assembly 22 or may engage the seat cushion 42 to help retain and inhibit movement of the inflatable bladder 20. The fitting 104 may extend through the seat cushion 42 in one or more embodiments.

A tube assembly 22 may fluidly connect an inflatable bladder 20 to a pressurized gas source. For example, the pressurized gas source may be configured to supply and/or store a volume of a pressurized gas or pressurized gas mixture and may include a tank and/or a pump. A plurality of tube assemblies 22 may be referred to as a set of tube assemblies 22. The tube assemblies 22 may have any suitable configuration. For example, a tube assembly 22 may be configured as a flexible tube, hose, or the like. Each tube assembly 22 may be fluidly connected to at least one inflatable bladder 20. For example, a tube assembly 22 may be connected to inflatable bladders 20 that are disposed in a common row on the seat cushion 42. In the configuration shown in FIG. 4, three tube assemblies 22 are provided that may be received in the connecting groove 72 and in different grooves 70 of the seat cushion 42 such that each tube assembly 22 provides pressurized gas to a pair of inflatable bladders 20. As such, each tube assembly 22 may be fluidly connected to at least two inflatable bladders 20 that may be disposed in a common row in one or more embodiments.

As is best shown in FIG. 7, each tube assembly 22 may include one or more tube fittings 110 that may couple the tube assembly 22 to a corresponding fitting 104 of an inflatable bladder 20. For instance, the fitting 104 of the inflatable bladder 20 may be coupled to the tube fitting 110 with an interference fit or in a male/female relationship. One or more tube fittings 110 may extend into a corresponding slit 62. For example, a tube fitting 110 may be at least partially received in a corresponding slit hole 90 in one or more embodiments. In addition, a tube fitting 110 may not extend to the bottom surface 80 in one or more embodiments.

One or more valves may be associated with a tube assembly 22. For example, a valve may be disposed between the pressurized gas source and a tube assembly 22 in one or more embodiments. The valve or valves may be operated to selectively provide pressurized gas to a tube assembly 22 to inflate at least one inflatable bladder 20 and to exhaust pressurized gas from at least one inflatable bladder 20 via the tube assembly 22.

Referring to FIGS. 2 and 6, the ventilated seat pad 24 may be disposed on the seat cushion 42 between the seat back trim cover 40 and the seat cushion 42. For example, the ventilated seat pad 24 may be disposed on the center seating region 52 and the first surface 56. In addition, the ventilated seat pad 24 may be disposed near the bottom of the seat back 14 and may be aligned with the lower back (e.g., lumbar or thoracic region) of a seat occupant.

The ventilated seat pad 24 may cover one or more inflatable bladders 20. As such, inflation of an inflatable bladder 20 that is covered by the ventilated seat pad 24 may exert force on the ventilated seat pad 24 and push the ventilated seat pad 24 toward the back of a seat occupant. Such positioning may allow an inflatable bladder 20 to be positioned behind the ventilated seat pad 24 such that the inflatable bladder 20 does not block ventilation holes in the ventilated seat pad 24, thereby facilitating operation of the ventilated seat pad 24. Accordingly, the first panel 100 of an inflatable bladder 20 may engage the ventilated seat pad 24 and may not engage the seat back trim cover 40 when the inflatable bladder 20 is covered by the ventilated seat pad 24.

As is best shown by comparing FIGS. 2 and 3, some but not all of the inflatable bladders 20 may be covered by the ventilated seat pad 24. In FIG. 2, the ventilated seat pad 24 covers four inflatable bladders 20, but does not cover two inflatable bladders 20 that are disposed above the ventilated seat pad 24 (i.e., disposed between the ventilated seat pad 24 and the top surface 54 of the seat cushion 42).

In at least one embodiment, the inflatable bladders 20 and tube assemblies 22 may be assembled to the seat cushion 42 in the following manner.

First the inflatable bladders 20 may be assembled to a corresponding tube assembly 22. The inflatable bladders 20 may be deflated prior to assembly to facilitate installation.

Second, the inflatable bladder 20 may be folded to provide a profile that may fit through a corresponding slit 62.

Third, the inflatable bladder 20 may be inserted through the slit 62 in a direction that may extend from the second surface 58 to the bottom surface 80 of the indentation 60. Insertion of the inflatable bladder 20 may help position the tube assembly 22 such that the fitting 104 of the inflatable bladder 20 and/or a portion of the tube assembly 22 may be disposed in the slit hole 90.

Next, the inflatable bladder 20 may be unfolded and positioned against the bottom surface 80 of the indentation 60. As such, the second panel 102 of the inflatable bladder 20 may be aligned with and may engage the bottom surface 80 of a corresponding indentation 60 after inflatable bladder 20 is inserted through the slit 62 and unfolded. In addition, the first panel 100 and/or the second panel 102 may be disposed proximate or may engage the perimeter surface 82 when the inflatable bladder 20 is unfolded. The configuration of the slit 62 and the indentation 60 may help position and align the inflatable bladder 20 within the indentation 60 and inhibit the inflatable bladder 20 from moving onto the first surface 56 of the seat cushion 42 before and after the seat back trim cover 40 is installed on the seat cushion 42.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
    a seat cushion that includes:
        a first surface,
        a second surface disposed opposite the first surface,
        a bottom surface that is spaced apart from the first surface,
        a perimeter surface that extends from the first surface to the bottom surface,
        an indentation that extends from the first surface to the bottom surface, and
        a slit that extends through the seat cushion from the indentation to the second surface;
    an inflatable bladder that is disposed in the indentation adjacent to the slit, wherein the perimeter surface extends around the inflatable bladder; and
    a tube assembly that is fluidly connected to the inflatable bladder, wherein the tube assembly is disposed proximate the second surface and extends into the slit.

2. The seat assembly of claim 1 wherein the indentation is recessed from the first surface.

3. The seat assembly of claim 1 wherein the slit extends from the bottom surface to the second surface and is completely spaced apart from the perimeter surface.

4. The seat assembly of claim 3 wherein the slit further comprises a slit hole and first and second slit branches that extend in opposite directions from the slit hole, wherein the slit hole receives the tube assembly.

5. The seat assembly of claim 4 wherein the seat cushion has a groove that extends from the second surface toward the first surface, wherein the groove receives the tube assembly and the slit hole extends from the groove to the bottom surface of the indentation.

6. The seat assembly of claim 4 wherein the slit hole is disposed proximate a center of the indentation and extends along a slit hole axis and wherein the perimeter surface is radially disposed with respect to the slit hole axis.

7. The seat assembly of claim 6 wherein the first and second slit branches are substantially coplanar with the slit hole axis and are completely spaced apart from the perimeter surface.

8. The seat assembly of claim 1 wherein the inflatable bladder is recessed with respect to the first surface when the inflatable bladder is deflated.

9. The seat assembly of claim 1 wherein the inflatable bladder is disposed between the seat cushion and a ventilated seat pad that is disposed on the first surface and that directs air through a trim cover that is disposed over the seat cushion.

10. A seat assembly comprising:
    a seat back having a seat cushion that includes:
        a first surface,
        a second surface disposed opposite the first surface, and
        a set of indentations, wherein members of the set of indentations are spaced apart from each other and extend from the first surface toward the second surface, and each member of the set of indentations has a bottom surface that is recessed from the first surface, and a set of slits, wherein each member of the set of slits extends from a corresponding member of the set of indentations and extends from the bottom surface to the second surface;

a set of inflatable bladders, wherein each member of the set of inflatable bladders is received in a corresponding member of the set of indentations; and a set of tube assemblies, wherein each member of the set of tube assemblies is fluidly connected to at least two members of the set of inflatable bladders.

11. The seat assembly of claim 10 wherein the seat cushion further comprises first and second side bolsters that extend along opposing lateral sides of the seat back and a center seating region that is disposed between the first and second side bolsters and that is configured to support a back of a seat occupant, wherein the set of indentations is disposed in the center seating region.

12. The seat assembly of claim 11 wherein the seat cushion further comprises a set of grooves that extend from the second surface toward the first surface, wherein each member of the set of grooves extends between two members of the set of slits and receives a member of the set of tube assemblies.

13. The seat assembly of claim 12 wherein the members of the set of grooves extend substantially parallel to each other.

14. The seat assembly of claim 13 wherein the members of the set of grooves extend laterally across the center seating region between the first and second side bolsters.

15. The seat assembly of claim 12 wherein each member of the set of slits has a slit length that extends from the bottom surface of a corresponding member of the set of indentations to a member of the set of grooves, wherein the slit length is substantially equal for each member of the set of slits.

16. The seat assembly of claim 10 wherein the seat assembly further comprises a ventilated seat pad that is disposed on the first surface and that directs air through a trim cover that is disposed over the seat cushion, wherein at least two members of the set of inflatable bladders are disposed between the seat cushion and the ventilated seat pad.

17. The seat assembly of claim 16 wherein at least two members of the set of inflatable bladders are disposed between the ventilated seat pad and a top surface of the seat cushion and are not covered by the ventilated seat pad.

18. A method of assembling a seat assembly, comprising:
providing a seat cushion that has a first surface, a second surface disposed opposite the first surface, an indentation that has a bottom surface that is recessed from the first surface, and a slit that extends from the bottom surface to the second surface;
providing an inflatable bladder that is fluidly connected to a tube assembly; and
inserting an inflatable bladder through the slit from the second surface to the bottom surface such that a portion of the tube assembly is disposed in the slit.

19. The method of claim 18 further comprising aligning the inflatable bladder with the bottom surface after inserting the inflatable bladder.

20. The method of claim 18 wherein the inflatable bladder is deflated before inserting the inflatable bladder through the slit.

\* \* \* \* \*